(No Model.)
E. T. LEONARD.
CAR COUPLING.
No. 263,543. Patented Aug. 29, 1882.
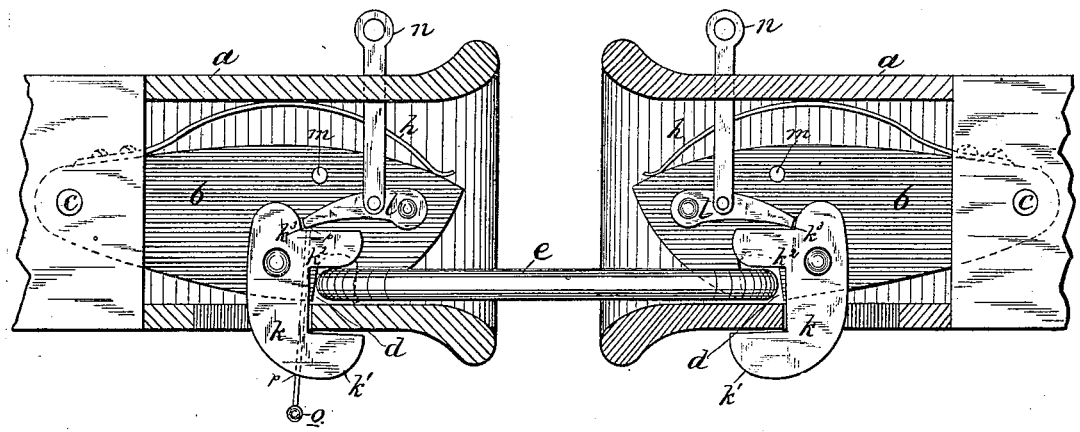
WITNESSES:
W. W. Hollingsworth
W. Read
INVENTOR:
E. T. Leonard
BY
ATTORNEYS.

UNITED STATES PATENT OFFICE.

EDMUND T. LEONARD, OF BALTIMORE, MARYLAND.

CAR-COUPLING.

SPECIFICATION forming part of Letters Patent No. 263,543, dated August 29, 1882.

Application filed January 20, 1882. (No model.)

*To all whom it may concern:*

Be it known that I, EDMUND T. LEONARD, of Baltimore city, in the State of Maryland, have invented a new and Improved Car-Coupling; and I do hereby declare that the following is a full, clear, and exact description of the same, reference being had to the accompanying drawing, forming part of this specification, in which the figure is a side elevation of my improved car-coupling, partly in section.

My invention relates to improvements in car-couplings; and it consists in the peculiar construction and arrangement of the parts, as hereinafter more fully set forth.

In the accompanying drawing, $a$ $a$ represent the draw-heads of my improved car-coupling.

$b$ represents a lever, pivoted by a pin, $c$, in the rear end of the draw-head $a$, and provided near the front end of its under edge with a recess, $d$, adapted to engage with the link $e$ in coupling the cars.

$h$ represents a spring secured to the upper edge of the lever $b$, and bearing also against the inner face of the top of the draw-head, the tension of the spring $h$ being constantly exerted to press the lever $b$ down in engagement with the link.

$k$ represents a bent lever pivoted to one side of the lever $b$, the function of which is to lock the latter in engagement with the link $e$. The locking-lever $k$, at its lower end, projects through a slot in the bottom of the draw-head, and is preferably rounded at $k'$. The upper end of the locking-lever $k$ is bent angularly at $k^2$, and provided with a recess, $k^3$, for the reception of the end of a pawl, $l$, pivoted to the side of the lever $b$.

$m$ is a pin secured to the face of the lever $b$, which acts as a stop for the pawl $l$.

$n$ represents an attachment secured to the pawl $l$, and passing thence through a slot in the top of the draw-head, whereby when it is desired to uncouple the cars the pawl $l$ can be raised out of its recess $k^3$ in the locking-lever and the cars uncoupled from above. To uncouple from below, the pawl is thrown out of its recess in the locking-lever by means of a pin, $o$, passing through passages $p$ in the bent portions $k'$ $k^2$ of the locking-lever $k$, and the rounded portion $k'$ of the locking-lever is pressed backwardly, raising the lever $b$ and uncoupling the cars, the bent upper end, $k^2$, of the locking-lever at the same time holding the link down in place in the draw-head and shoving it out of the recess $d$ in the lever $b$.

Instead of pivoting the locking-lever $k$ and its pawl to one side of the recessed lever $b$, they may operate in a central slot in the recessed lever $b$, whereby they may be better protected.

This car-coupling is automatic, composed of very few parts, and is exceedingly simple in its construction and cheap, and can be applied to passenger or freight or coupled to any car now in use.

I am aware that a hook and tumbler pivoted in a draw-head have heretofore been employed, and I therefore lay no claim, broadly, to such construction, my invention being confined to the construction claimed.

What I claim as my invention is—

1. The combination, with the recessed lever $b$, pivoted in a draw-head, spring $h$, and link $e$, of the locking-lever $k$ and pawl $l$, substantially as described, and for the purpose set forth.

2. The combination, with the recessed lever $b$, pivoted in a draw-head, spring $h$, and link $e$, of the locking-lever $k$, pivoted to the lever $b$, and provided with the passages $p$, pin $o$, and pawl $l$, substantially as described, and for the purpose set forth.

3. The combination, with the recessed lever $b$, pivoted in a draw-head, spring $h$, and link $e$, of the locking-lever $k$, pivoted to one face of the lever $b$, pawl $l$, pivoted to the lever $b$, stop $m$, and attachment $n$, secured to the pawl, whereby in uncoupling the pawl is disengaged, the recessed lever lifted, and the link forced out of its recess by the locking-lever, substantially as described, and for the purpose set forth.

EDMUND T. LEONARD.

Witnesses:
SOLON C. KEMON,
CHAS. A. PETTIT.